(12) United States Patent
Zhao et al.

(10) Patent No.: US 10,459,324 B2
(45) Date of Patent: Oct. 29, 2019

(54) LIGHT SOURCE DEVICE AND PROJECTION DISPLAY DEVICE

(71) Applicants: HISENSE CO., LTD., Qingdao, Shandong (CN); HISENSE USA CORPORATION, Suwanee, GA (US); HISENSE INTERNATIONAL CO., LTD., Qingdao, Shandong (CN)

(72) Inventors: Fei Zhao, Shandong (CN); Wei Li, Shandong (CN); Xianrong Liu, Shandong (CN)

(73) Assignees: Hisense Co., Ltd., Qingdao, Shandong (CN); Hisense USA Corporation, Suwanee, GA (US); Hisense International Co., Ltd., Qingdao, Shandong (CN)

( * ) Notice: Subject to any disclaimer, the term of this patent is extended or adjusted under 35 U.S.C. 154(b) by 0 days.

(21) Appl. No.: 16/138,042

(22) Filed: Sep. 21, 2018

(65) Prior Publication Data
US 2019/0025684 A1    Jan. 24, 2019

Related U.S. Application Data

(63) Continuation of application No. 14/688,715, filed on Apr. 16, 2015, now Pat. No. 10,101,643.

(30) Foreign Application Priority Data

Oct. 20, 2014   (CN) .......................... 2014 1 0556532

(51) Int. Cl.
*F21S 10/02*    (2006.01)
*G03B 21/20*    (2006.01)
(Continued)

(52) U.S. Cl.
CPC ......... *G03B 21/204* (2013.01); *G02B 26/008* (2013.01); *G03B 33/08* (2013.01)

(58) Field of Classification Search
CPC .... G03B 21/204; G03B 26/008; G03B 33/08; F21S 10/007; F21S 10/02; F21S 10/00
See application file for complete search history.

(56) References Cited

U.S. PATENT DOCUMENTS

| | | |
|---|---|---|
| 2012/0242912 A1 | 9/2012 | Kitano |
| 2013/0100420 A1 | 4/2013 | Ferri et al. |

(Continued)

FOREIGN PATENT DOCUMENTS

| | | |
|---|---|---|
| CN | 102385133 | 3/2012 |
| CN | 102520569 | 6/2012 |

(Continued)

OTHER PUBLICATIONS

PCT/CN2015/07230, International Search Report dated Jun. 12, 2015 (15 pages) and English translation (4 pages).

(Continued)

*Primary Examiner* — Anabel Ton
(74) *Attorney, Agent, or Firm* — Boyle Fredrickson, S.C.

(57) ABSTRACT

The light source device includes a laser for generating laser light, a fluorescent wheel, a filter wheel and a control unit. The fluorescent wheel includes a reflection section, and a transmission section. First and second phosphors are attached on a surface of the reflection section, and the first phosphor is excited by the laser light to emit yellow light and the second phosphor is excited by the laser light to emit green light. The filter wheel comprises a transparent section, a red filter section and a green filter section. The control unit controls the fluorescent wheel and the filter wheel to rotate in synchronization. the laser light emitted from the transmission section of the fluorescent wheel and a part of the (Continued)

yellow light enter into the transparent section, another part of the yellow light enter into the red filter section, and the green light enter into the green filter section.

20 Claims, 7 Drawing Sheets

(51) Int. Cl.
 *G02B 26/00* (2006.01)
 *G03B 33/08* (2006.01)

(56) References Cited

U.S. PATENT DOCUMENTS

| | | | |
|---|---|---|---|
| 2013/0242534 A1 | 9/2013 | Pettitt et al. | |
| 2013/0250546 A1* | 9/2013 | Hu | F21V 9/40 |
| | | | 362/84 |
| 2016/0109789 A1* | 4/2016 | Zhao | G03B 33/08 |
| | | | 362/84 |

FOREIGN PATENT DOCUMENTS

| | | |
|---|---|---|
| CN | 102720986 | 10/2012 |
| CN | 103062672 | 4/2013 |
| CN | 103424837 | 12/2013 |
| CN | 103792635 | 5/2014 |
| CN | 103888740 | 6/2014 |
| CN | 203745788 | 7/2014 |
| CN | 104298059 | 1/2015 |
| CN | 104375351 | 2/2015 |
| CN | 204302653 | 4/2015 |
| CN | 104597698 | 5/2015 |

OTHER PUBLICATIONS

CN201410556532.3 First Office Action (12 pages) and English Translation (16 pages).
CN201410556532.3 Second Office Action (6 pages) and English Translation (11 pages).
CN201410556532.3 Third Office Action (6 pages) and English Translation (10 pages).

* cited by examiner

LIGHT SOURCE DEVICE AND PROJECTION DISPLAY DEVICE

CROSS-REFERENCES TO RELATED APPLICATIONS

This application is a continuation of U.S. patent application Ser. No. 14/688,715 filed Apr. 16, 2015, which claims the priority to Chinese Patent Application No. 201410556532.3, filed with the State Intellectual Property Office on Oct. 20, 2014, the content of which is hereby incorporated by reference in its entirety.

FIELD

The present disclosure relates to the field of laser light sources and particularly to a light source device and a projection display device.

BACKGROUND

A high-pressure mercury lamp (which is a high-intensity gas discharge light source) applied in a traditional projection display product (simply a projector) as a projection light source has been increasingly replaced with a new light source due to its short lifetime, high cost of replacing a bulb, highly poisonous mercury, etc., and here the laser light source which is a solid light source has become an emerging option of the projection light source due to a series of advantages of high brightness, high efficiency, a long lifetime, a good color gamut, environment protection, etc. In the meanwhile, laser projector products also have become new customer electronic products popular among customers as projection display products have their applications extending gradually from meeting rooms to homes.

Typically a laser light source is provided with laser light to excite phosphors to generate light in three primary colors. For example, the phosphors, attached on a fluorescent wheel, capable of being excited by the laser light to emit light, are excited by the laser light to generate light at corresponding wavelengths, which may be filtered resulting in the three primary colors. Natural colors may be generated by synthesizing the three red, green and blue colors in different proportions, so a color picture may be displayed by a projection display product as a result of synthesizing the light in the three primary colors.

SUMMARY

In one aspect, some embodiment of the disclosure provide a light source device including a laser for generating laser light, a fluorescent wheel, a filter wheel and a control unit. The fluorescent wheel includes a reflection section, and a transmission section for transmitting the laser light. A first phosphor and a second phosphor are attached on a surface of the reflection section, and the first phosphor is configured to be excited by the laser light to emit yellow light and the second phosphor is configured to be excited by the laser light to emit green light. The filter wheel comprises a transparent section, a red filter section and a green filter section. The control unit is configured to control the fluorescent wheel and the filter wheel to rotate in synchronization, and the laser light emitted from the transmission section of the fluorescent wheel and a part of the yellow light emitted from the first phosphor enter into the transparent section of the filter wheel, another part of the yellow light emitted from the first phosphor enter into the red filter section of the filter wheel, and the green light emitted from the second phosphor enter into the green filter section of the filter wheel.

In another aspect, some embodiments of the disclosure further provide a projection display device including a laser for generating laser light, a fluorescent wheel, a filter wheel and a control unit. The fluorescent wheel includes a reflection section, and a transmission section capable of transmitting the laser light. A first phosphor and a second phosphor are attached on a surface of the reflection section, and the first phosphor is configured to be excited by the laser light to emit yellow light and the second phosphor is configured to be excited by the laser light to emit green light. The filter wheel comprises a transparent section, a red filter section and a green filter section. The control unit is configured to control the fluorescent wheel and the filter wheel to rotate in synchronization, and the laser light emitted from the transmission section of the fluorescent wheel and a part of the yellow light emitted from the first phosphor enter into the transparent section of the filter wheel, another part of the yellow light emitted from the first phosphor enter into the red filter section of the filter wheel, and the green light emitted from the second phosphor enter into the green filter section of the filter wheel.

Moreover some embodiments of the disclosure further provide a projection display device including a laser for generating laser light, a fluorescent wheel, a filter wheel and a control unit. The fluorescent wheel includes a reflection section, and a transmission section for transmitting the laser light. A first phosphor and a second phosphor are attached on a surface of the reflection section, and the first phosphor is configured to be excited by the laser light to emit a first light in a first band, and the second phosphor is configured to be excited by the laser light to emit a second light in a second band. The filter wheel comprises a transparent section, a first filter section and a second filter section. The control unit is configured to control the fluorescent wheel and the filter wheel to rotate in synchronization, and the laser light emitted from the transmission section of the fluorescent wheel and a part of the first light emitted from the first phosphor enter into the transparent section of the filter wheel, another part of the first light emitted from the first phosphor enter into the first filter section of the filter wheel, and the second light emitted from the second phosphor enter into the second filter section of the filter wheel.

DETAILED DESCRIPTION OF THE EMBODIMENTS

In order to make the objects, technical solutions and advantages of the disclosure more apparent, the disclosure will be further described below with reference to the drawings, and apparently the embodiments described below are only a part but not all of the embodiments of the disclosure. All the other embodiments which may occur to those ordinarily skilled in the art based upon the embodiments here of the disclosure without any inventive effort shall fall into the claimed scope of the disclosure.

Some embodiments of the disclosure provide a light source device (not illustrated) including a laser for generating laser light, a fluorescent wheel, a filter wheel and a control unit, where the fluorescent wheel includes at least one reflection section, and at least one transmission section capable of transmitting the laser light; at least one phosphor capable of being excited by the laser light to emit light in a first wavelength band, and at least one phosphor capable of being excited by the laser light to emit light in a second wavelength band are attached on the surface of the reflection section; the filter wheel includes at least one transparent section, at least one first filter section and at least one second filter section; and the control unit is configured to control the fluorescent wheel and the filter wheel to rotate in synchronization so that the transparent section of the filter wheel corresponds to the transmission section of the fluorescent wheel, and a part of the phosphor, on the fluorescent wheel, excited by the laser light to emit the light in the first band, the first filter section of the filter wheel corresponds to another part of the phosphor, on the fluorescent wheel, excited by the laser light to emit the light in the first band, and the second filter section of the filter wheel corresponds to the phosphor, on the fluorescent wheel, excited by the laser light to emit the light in the second band.

The light in the first band and the light in the second band may be visible light applicable to the inventive solution, for example, the light in the first band may be yellow light, green light, etc.; and the light in the second band may be green light, yellow light, red light, etc. Moreover the first filter section may be a red filter section, a green filter section, etc., and the second filter section may be a green filter section, a red filter section, etc.

In order to make the solution according to the embodiment above of the disclosure more apparent, it will be described below by way of an example in which the light in the first band is yellow light, the light in the second band is green light, the first filter section is a red filter section, and the second filter section is a green filter section.

Figure 9:
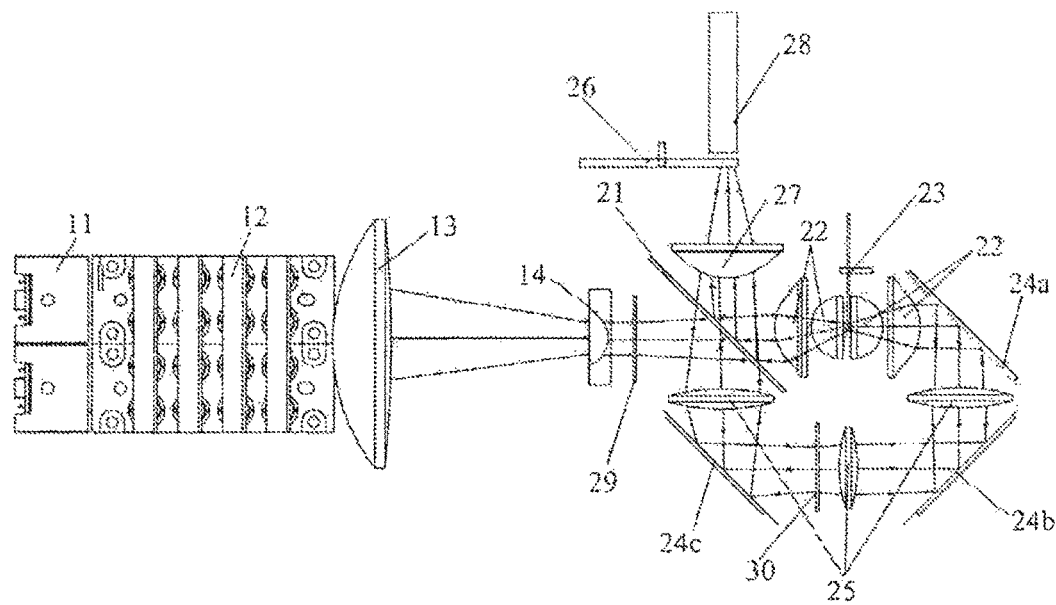
FIG. 9 illustrates a schematic structural diagram of a light source device according to some embodiments of the disclosure.

As illustrated in FIG. 9, a light source device according to some embodiments of the disclosure includes a laser for generating laser light, a fluorescent wheel 23, a filter wheel 26 and a control unit (not illustrated).

Figure 3:
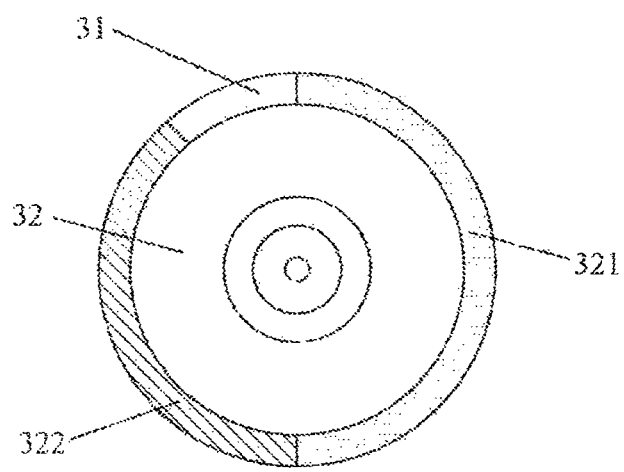
FIG. 3 illustrates a fluorescent wheel according to some embodiments of the disclosure.
Figure 4:
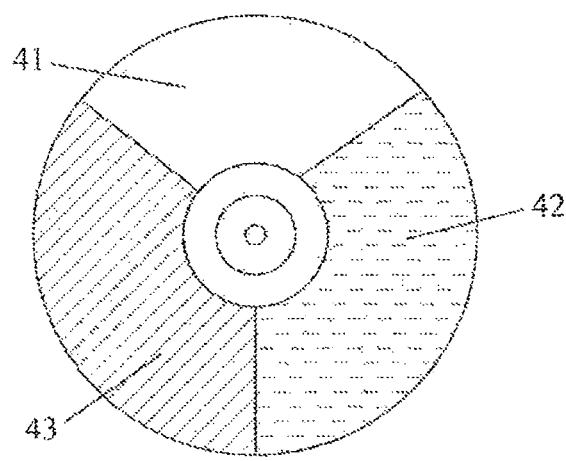
FIG. 4 illustrates a filter wheel according to some embodiments of the disclosure.

As illustrated in FIG. 3, the fluorescent wheel may include a reflection section 32, and a transmission section 31 capable of transmitting the laser light, and phosphors 321 and 322 capable of being excited by the laser light to transmit light in two different colors are attached on the surface of the reflection section. As illustrated in FIG. 4, the filter wheel may include a transparent section 41, and filter sections 42 and 43 in two colors; and the control unit may be configured to control the fluorescent wheel and the filter wheel to rotation in synchronization.

The light source device may further include a beam shaping device (including a reflection mirror 12, a convex lens 13 and a concave lens 14), a first optical axis transformation lens 21 and a light converging device; the beam shaping device may shape the laser light; the first optical axis transformation lens may be arranged between the beam shaping device and the fluorescent wheel to transmit the shaped laser light and to reflect fluorescent light from the fluorescent wheel; the light converging device may include a plurality of optical axis transformation lenses and a focusing lens 27; the plurality of optical axis transformation lenses may be configured to change a light path of the shaped laser light transmitted through the transmission section of the fluorescent wheel; and the focusing lens may focus the light reflected and the light transmitted by the first optical axis transformation lens onto the same light path.

Figure 1:
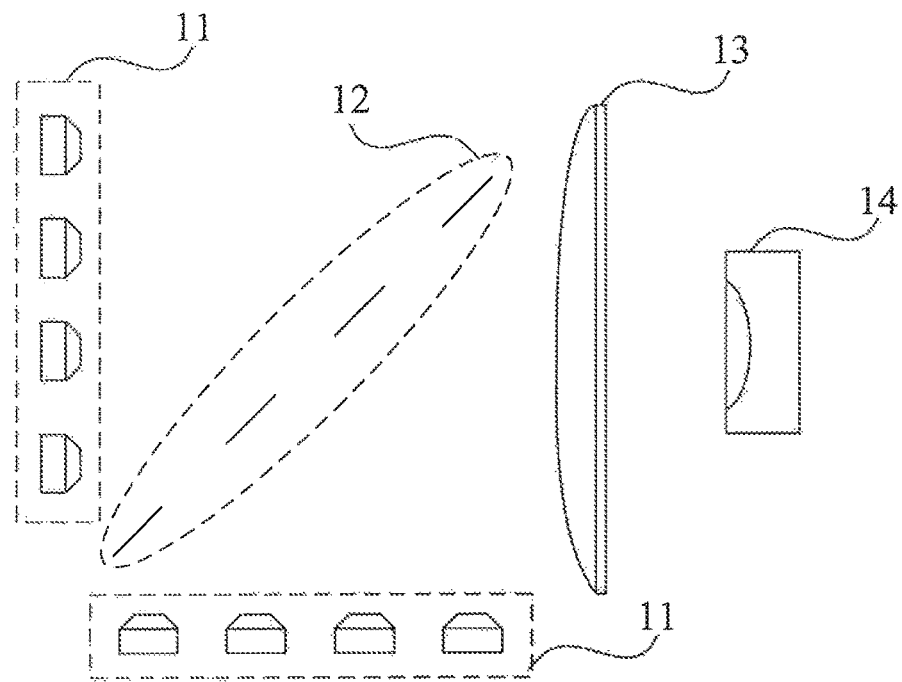
FIG. 1 illustrates a schematic structural diagram of a beam shaping device.
Figure 2:
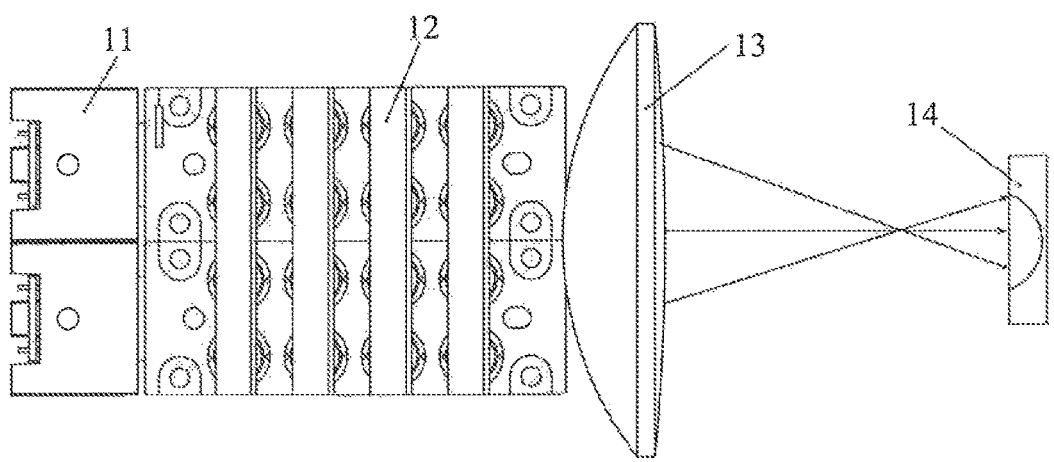
FIG. 2 illustrates a mechanical diagram of the beam shaping device.

As illustrated in FIG. 1 and FIG. 2, the laser may include laser arrays 11 at low power, so that when the power of the laser light is up to tens of watts or higher, the laser light may be shaped (e.g., the transmission direction of the light beam is changed, the light is synthesized, the light is focused, or the light path is transformed) by the beam shaping device (also referred to as a light synthesizing lens) including the reflection mirror 12, the convex lens 13 and the concave lens 14, arranged at 45° from both of the laser arrays, and the shaped laser light may in turn excite the phosphors to emit fluorescent light.

Figure 5:
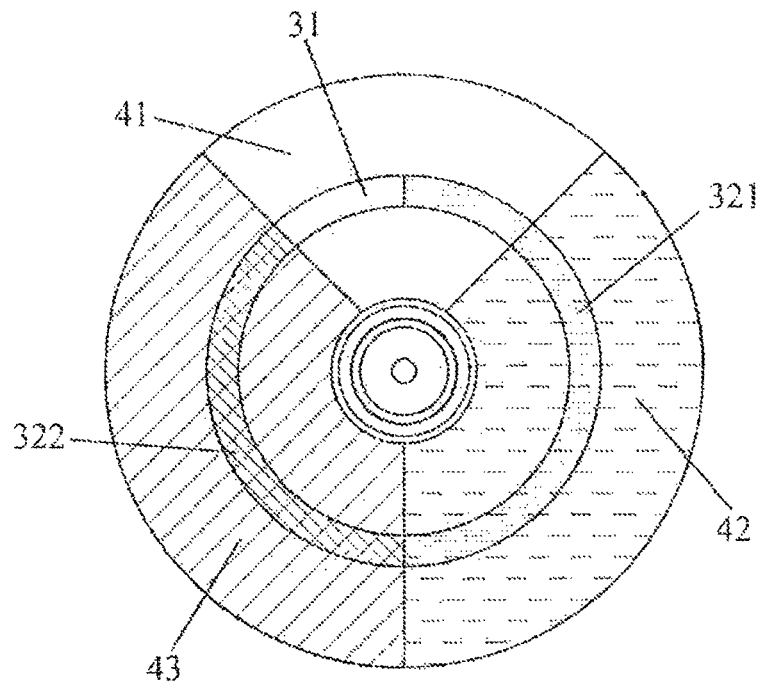
FIG. 5 illustrates a diagram of a correspondence relationship between a fluorescent wheel and a filter wheel according to some embodiments of the disclosure.

With the light source device according to the embodiment above of the disclosure, after the laser light is shaped by the beam shaping device, the shaped laser light excites the phosphors on the fluorescent wheel, the phosphors are excited to emit fluorescent light which is reflected by the first optical axis transformation lens and focused by the focusing lens and then irradiated on the filter wheel, and the filter wheel transmits the shaped laser light and filters out light in three colors from the fluorescent light to thereby generate light in four primary colors. As illustrated in FIG. 5, a phosphor, on the fluorescent wheel, capable of being excited to emit fluorescent light corresponds to a transparent section and a filter section on the filter wheel, and when the phosphor is excited by the shaped laser light to emit fluorescent light, the transparent section may transmit light in a color corresponding to a primary spectrum included in the band of the phosphor, and the filter section filters out light in a color corresponding to a spectrum of an adjacent band included in the band of the phosphor; another phosphor, on the fluorescent wheel, capable of being excited to emit fluorescent light corresponds to a filter section on the filter wheel, and when the another phosphor is excited by the shaped laser light to emit fluorescent light, light in a color corresponding to a primary spectrum in the band of the another phosphor is filtered out; and the transmission section on the fluorescent wheel corresponds to the transparent section on the filter wheel to thereby transmit the shaped laser light, so that finally the light in the four primary colors may be generated from a light emission face of the filter wheel according to the setting on and the correspondence relationship between the fluorescent wheel and the filter wheel. The light in the four primary colors may be synthesized into a number of colors in a wider color gamut for a technical effect of wider color gamut of the light source device as compared with synthesis of the three primary colors into a number of colors.

In the light source device according to some embodiments of the disclosure, a phosphor capable of being excited by the laser light to emit yellow light, and a phosphor capable of being excited by the laser light to emit green light are attached on the surface of the reflection section of the fluorescent wheel, and the laser light may be in blue band. As may be apparent from the spectrum of natural light, the yellow band includes a part of the spectrum of light in red band, so the phosphors are excited by the laser light to emit yellow fluorescent light and green fluorescent light which may be further reflected by the first optical axis transformation lens and then focused by the focusing lens to be irradiated on the filter wheel and thus transmitted and filtered by the filter wheel.

In some embodiments of the disclosure, the transparent section of the filter wheel corresponds to the transmission section of the fluorescent wheel, and a part of the phosphor, on the fluorescent wheel, excited by the laser light to emit yellow light; the red filter section of the filter wheel corresponds to another part of the phosphor, on the fluorescent wheel, excited by the laser light to emit yellow light; and the green filter section of the filter wheel corresponds to the phosphor, on the fluorescent wheel, excited by the laser light to emit green light.

The phosphor, on the fluorescent wheel, capable of being excited to emit yellow fluorescent light corresponds to the transparent section and the red filter section on the filter wheel, and when the phosphor is excited by the laser light to emit yellow fluorescent light, the transparent section may transmit yellow light, and the red filter section may filter out red light from the yellow fluorescent light.

Figure 11:
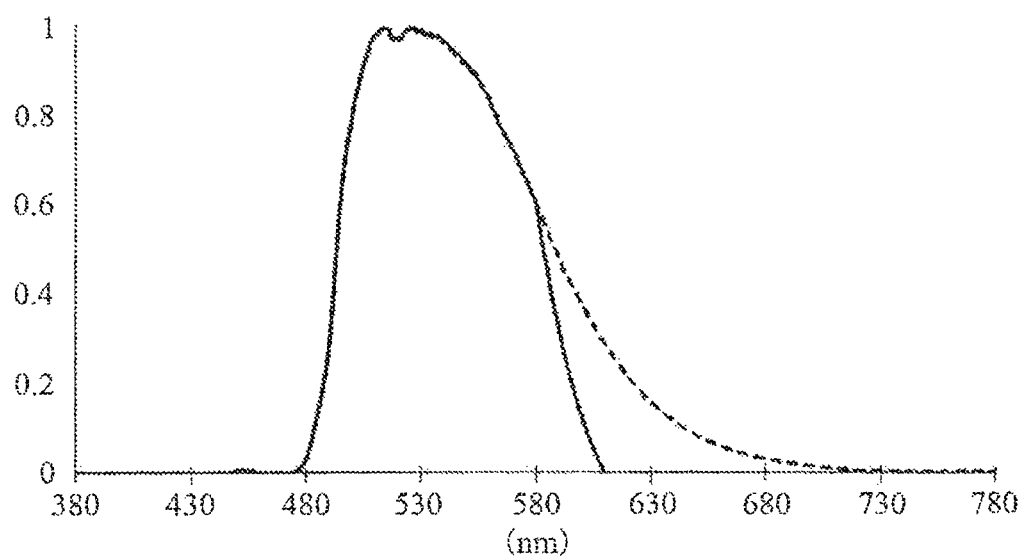
FIG. 11 illustrates a schematic diagram of a spectrum of green light filtered out in the light source device according to some embodiments of the disclosure.

The other phosphor, on the fluorescent wheel, capable of being excited to emit green light corresponds to the green filter section on the filter wheel, and when the phosphor is excited by the laser light to emit green fluorescent light, purer green light may be filtered out. As illustrated in FIG. 11, the solid line represents the spectrum of the green light filtered out by the green filter section, whereas the dotted line represents the spectrum of the green light which has not been filtered yet, and apparently the purer green color may be filtered out by the filter section so that the green color may appear more distinct in a color picture.

The transmission section on the fluorescent wheel corresponds to the transparent section on the filter wheel to thereby transmit the blue laser light.

Figure 12:
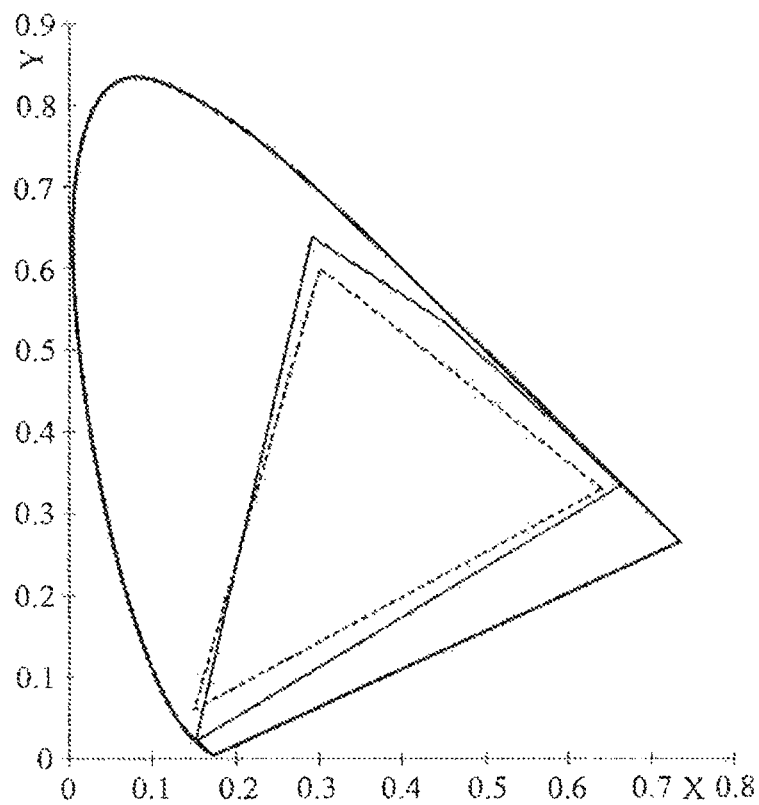
FIG. 12 illustrates a schematic diagram of a color gamut as a result of synthesizing four primary colors generated by the light source device according to some embodiments of the disclosure.

In summary, in some embodiments of the disclosure, the red light is filtered out by the red filter section of the filter wheel from a part of the yellow light, the green color becomes purer due to the green filter section (a narrower width of the spectrum represents a purer color), the other part of the yellow light is transmitted directly without being filtered, and the blue laser light is also transmitted directly, thus resulting in the light in four colors in total. With the setting on and the correspondence relationship between the fluorescent wheel and the filter wheel, finally the four primary colors of yellow, red, green and blue are generated from the light emission face of the filter wheel; and the light in these four colors may be synthesized into a number of colors. In the spectrum diagram as illustrated in FIG. 12, the dotted line zone in the horseshoe-shaped spectrum color gamut represents a color gamut range of colors into which three primary colors are synthesized in the prior art, whereas the solid line zone represents a color gamut range of colors into which the four primary colors are synthesized in some embodiments of the disclosure, and apparently there is a wider color gamut of the light source device according to some embodiments of the disclosure.

Figure 6:
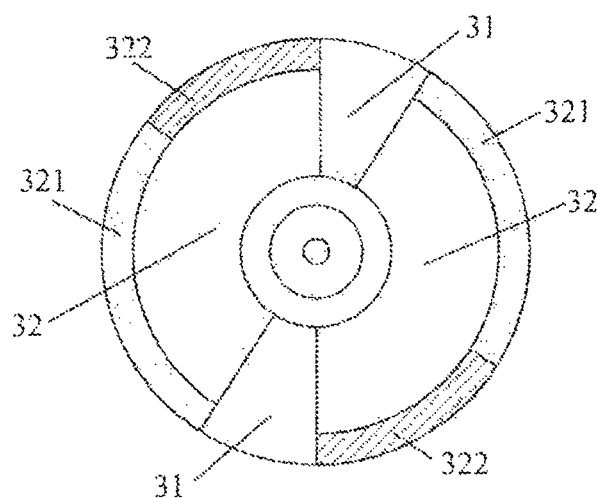
FIG. 6 illustrates a fluorescent wheel according to some further embodiments of the disclosure.
Figure 7:
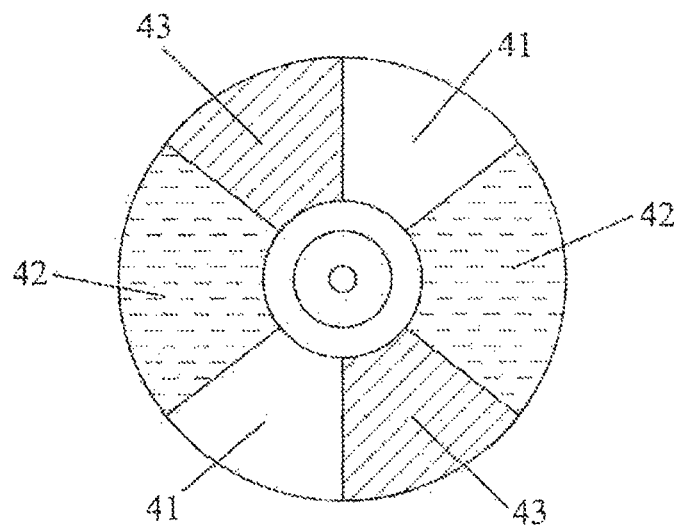
FIG. 7 illustrates a filter wheel according to some further embodiments of the disclosure.
Figure 8:
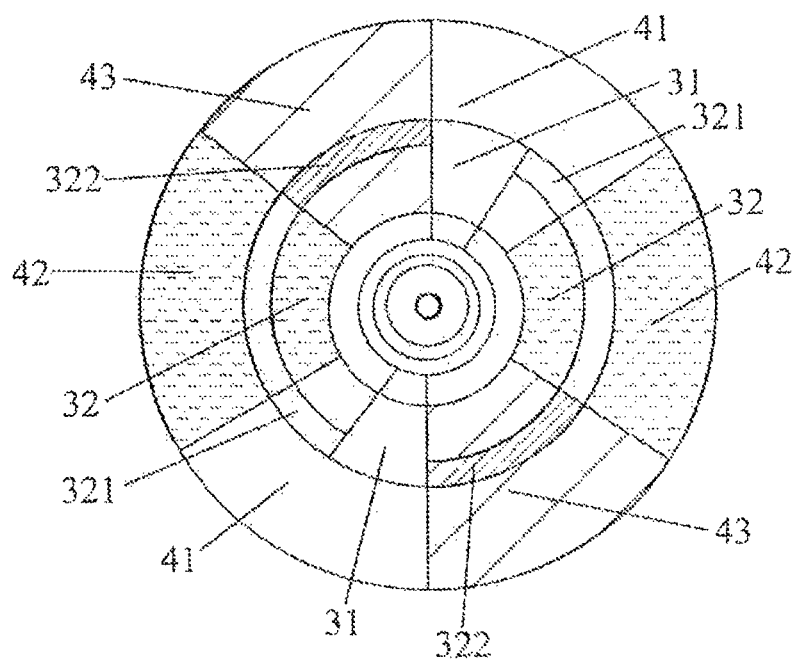
FIG. 8 illustrates a diagram of a further correspondence relationship between a fluorescent wheel and a filter wheel according to some further embodiments of the disclosure.

FIG. 6 to FIG. 8 illustrates the structure of and the correspondence relationship between the fluorescent wheel and the filter color in some further examples thereof according to some further embodiments of the disclosure.

In the fluorescent wheel, the numbers of transmission section 31, phosphors 321 excited by the laser light to emit yellow light, and phosphors 322 excited by the laser light to emit green light may be two respectively, and here the two transmission sections may be centrally symmetrically distributed, the two phosphors excited by the laser light to emit yellow light may be centrally symmetrically distributed, and the two phosphors excited by the laser light to emit green light may be centrally symmetrically distributed. In the filter wheel, the numbers of transparent sections 41, red filter sections 42 and green filter sections 43 may be two respectively, and here the two transparent sections may be centrally symmetrically distributed, the two red filter sections may be centrally symmetrically distributed, and the two green filter sections may be centrally symmetrically distributed.

Optionally one transmission section, one phosphor excited by the laser light to emit yellow light, and one phosphor excited by the laser light to emit green light occupy together one half circle; and one transparent section, one red filter section and one green filter section occupy together one half circle.

In some embodiments of the disclosure, in the fluorescent wheel, the transmission section, the phosphor excited by the laser light to emit yellow light, and the phosphor excited by the laser light to emit green light occupy sequentially the angles of 28°, 93° and 59° in the half circle respectively; and in the filter wheel, the transparent section 41, the red filter section 42 and the green filter section 43 occupy sequentially the angles of 51°, 70° and 59° in the half circle respectively.

There may be such a mirrored correspondence relationship between the fluorescent wheel and the filter wheel that the transparent section 41 of the filter wheel corresponds to the transmission section 31 (28°) and a part of the phosphor 321 (23°) excited by the laser light to excite yellow light, of the fluorescent wheel, the red filter section 42 corresponds to the remaining phosphor 321 (70°) excited by the laser light to excite yellow light, and the green filter section 43 corresponds to the phosphor 322 (59°) excited by the laser light to excite green light.

The laser light is in blue band. Further to the description above, the laser light transmitted from the transmission section of the fluorescent wheel is transmitted through the transparent section of the filter wheel; for the light in yellow band emitted as a result of excitation by the laser light, the part thereof corresponding to the transparent section of the filter wheel is transmitted through the transparent section of the filter wheel as yellow light, and the part thereof corresponding to the red filter section of the filter wheel is filtered out and transmitted through the red filter section as red light; and for the light in green band emitted as a result of excitation by the laser light, the corresponding green light is filtered out by the green filter section of the filter wheel, so that the light transmitted through the filter wheel includes the laser light in blue band, the yellow light, the red light and the green light.

When a phosphor is excited for conversion into light energy at a corresponding wavelength, the efficiency of conversion becomes lower at a longer wavelength, so in the embodiments of the disclosure, the red light is filtered out by the red filter section from the yellow fluorescent light, and since the wavelength of the yellow light is shorter than the wavelength of the red light, there will be higher light energy of the red light filtered out from the yellow light generated by the excited phosphor excited by the laser light to emit yellow light, as compared with the red light generated by the excited phosphor excited by the laser light to emit red light.

The reason for the improvement in light emission efficiency of the red light and thus the improvement in overall brightness of the light source device in the embodiments above of the disclosure will be described below.

With the light source device according to some embodiments of the disclosure, there will be higher light emission efficiency of the red light filtered out from the yellow light emitted by yellow fluorescent powder (the phosphor coated on the fluorescent wheel to emit the yellow light upon being excited by the laser light) excited by the laser light in the embodiments of the disclosure as compared with the red light filtered out from the red light emitted by the red fluorescent powder (the phosphor coated on the fluorescent wheel to emit red light upon being excited by the laser light) excited by the laser light in the prior art, as depicted In Table-1, Table-2 and Table-3 below, for example.

TABLE 1

| Schemes | Brightness proportion of the filtered-out red light in the white light | Brightness of the light emitted by the light source (lm/lumen) | Preset angles on the fluorescent wheel | | | |
|---|---|---|---|---|---|---|
| | | | Yellow | Red/Yellow | Green | Blue |
| Red fluorescent powder | 7.64% | 8257 | 23 | 70 | 59 | 28 |
| Yellow fluorescent powder | 7.64% | 9695 | 31 | 56 | 65 | 28 |
| Yellow fluorescent powder | 11.30% | 8706 | 23 | 70 | 59 | 28 |

As may be apparent from Table-1 above, in the scheme with the red fluorescent powder, and with the yellow fluorescent powder at 23°, the red fluorescent powder at 70°, the green fluorescent powder at 59°, and the blue fluorescent powder at 28°, the four-primary color scheme achieves the overall brightness of 8257 lm of the white light (the light into which the four primary colors are synthesized) emitted by the light source device, under the circumstance that the brightness proportion (the brightness proportion of the red light in the white light) is 7.64%; and with the same setting of the angles (i.e., 23°, 70°, 59° and 28° as described above) except for the yellow fluorescent powder instead of the red fluorescent powder (of course, the filter wheel will be adjusted accordingly to the scheme where the red light is filtered out from the yellow light), as may be apparent from Table-1, the brightness proportion of the red light in the white light is as high as 11.30%. Apparently with the same setting of the angles, there is higher light emission efficiency, and thus higher brightness, of the red light filtered out from the yellow light, and also the overall brightness of the light source device may be improved by (8706−8257)/8257=5.43%.

In a practical application, if the red light at a lower brightness proportion is desirable, then the angles on the fluorescent powders may be reallocated as needed.

In Table-1 above, with the scheme where the red light is filtered out from the yellow light, if the brightness proportion of the red light in the white light is maintained as the scheme where the red fluorescent powder is excited (that is, the brightness proportion of the red light in the white light is 7.64%), then the angle for the red segment may be lowered (from 70° to 56°) for allocation to other color segments. In this embodiment, for example, the angle of the yellow fluorescent powder for generating the yellow light is increased by 8°, and the angle of the green fluorescent powder for generating the green light is increased by 6°, whereas other color segments remain as they are. In this embodiment, the efficiency of conversion in exciting yellow color and green color is much higher than the efficiency of conversion in exciting red light (because the wavelengths of all the other color segments are shorter than the wavelength of the red light), so the overall brightness of the light source device may be improved by (9695−8257)/8257=17.42% as calculated from the data in the table.

There are schemes for setting the angles on the fluorescent wheel as depicted in Table-2 below.

| Schemes | Brightness proportion of the filtered-out red light in the white light | Brightness of the light emitted by the light source (lm/lumen) | Preset angles on the fluorescent wheel | | | |
|---|---|---|---|---|---|---|
| | | | Yellow | Red/Yellow | Green | Blue |
| Red fluorescent powder | 11.30% | 7323 | 18 | 88 | 52 | 22 |
| Yellow fluorescent powder | 11.30% | 8706 | 23 | 70 | 59 | 28 |

As may be apparent from Table-2 above, in the scheme with the red fluorescent powder, there is overall brightness of 7323 lm of the white light (the light into which the four primary colors are synthesized) emitted by the light source device, under the circumstance that the brightness proportion (the brightness proportion of the red light in the white light) is 11.30%; and in the scheme where the red light is filtered out from the yellow light, if the brightness proportion of the red light in the white light is maintained as the scheme where the red fluorescent powder is excited (that is, the brightness proportion in the red light in the white light is 11.30%), then the angle of the fluorescent powder for generating red light may be lowered from 88° to 70°, and the remaining angle may be allocated to other colors. Similar to Table-1, the light in the other colors may be provided with more excitation energy of the laser light, thus the efficiency of light energy and hence the brightness may be improve, and in this scheme, the overall brightness of the light source device may be improved by (8706−7323)/7323=18.89%. On the other hand, with the scheme where the red light is generated using the original red fluorescent powder, a higher angle needs to be allocated to the red fluorescent powder, and there may also a loss of the overall brightness of the light source.

There are other schemes for setting the angles on the fluorescent wheel as depicted in Table-3 below.

| Schemes | Brightness Proportion of the filtered-out red light in the white light | Brightness of the light emitted by the light source (lm/lumen) | Preset angles on the fluorescent wheel | | | |
|---|---|---|---|---|---|---|
| | | | Yellow | Red/Yellow | Green | Blue |
| Red fluorescent powder | 8.70% | 8109 | 25 | 76 | 55 | 24 |
| Yellow fluorescent powder | 8.70% | 9420 | 30 | 60 | 62 | 28 |
| Yellow fluorescent powder | 7.64% | 9695 | 31 | 56 | 65 | 28 |

As may be apparent from Table-3 above, with the scheme where the red light is generated using the red fluorescent powder, when the brightness proportion of the red light in the white light is 8.7%, the angle of the red fluorescent powder is 76°, and the overall brightness of the light source is 8109 lm; and with the scheme where the red light is filtered out using the yellow fluorescent powder under the same brightness proportion of the red light, the angle of the yellow fluorescent powder for generating the red light is 60°, and the overall brightness of the light source is 9420 lm, that is, the overall brightness of the light source is improved by 16.71%.

In the scheme with the yellow fluorescent powder, when the angle of the yellow fluorescent powder for generating the red light is changed, as may be apparent from comparison between the second (the total angle of the yellow fluorescent powder is 90°) and third (the total angle of the yellow fluorescent powder is 87°) rows in Table-3, when the angle of the yellow fluorescent powder for generating the red light is lowered from 60° to 56°, and the remaining angle is added to the green fluorescent powder for generating the green light and the yellow fluorescent powder for generating the yellow light, since the green light and the yellow light may be emitted at higher efficiency and thus higher brightness although the brightness proportion of the red light is lowered, the overall brightness of the light source device may be improved from 9420 lm to 9695 lm.

As may be apparent from the description above, with the technical solution according to the embodiment above of the disclosure, the light emission efficiency of red light may be higher and thus the brightness of the red light may be higher, given the same angle scheme; and due to the higher light emission efficiency of the red light, the angle, on the circle, occupied by the phosphor excited to emit the yellow light may be lower than the angle occupied by the phosphor excited to emit the red light with the same energy efficiency, so that the angles may be reallocated in such a way that the proportions of the phosphors excited to emit the light in the other colors may be increased as appropriate, and the light in the other colors may be excited at higher energy than before and thus emitted at higher light energy to thereby improve their light emission efficiency so that the overall brightness of the light source device may be improved.

With the light source device according to the embodiment above of the disclosure, the red color may appear more distinct in a color picture, the overall brightness of the system may also be improved, and the color gamut thereof may also be larger than the color gamut of the existing High Definition TV set standard by more than 30%.

Figure 10:
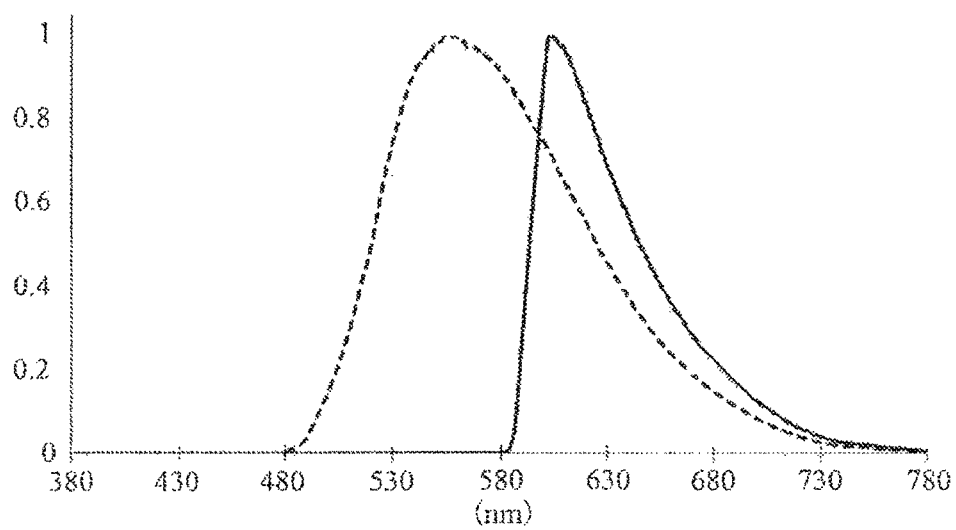
FIG. 10 illustrates a schematic diagram of a spectrum of red light filtered out in the light source device according to some embodiments of the disclosure.
Figure 13:
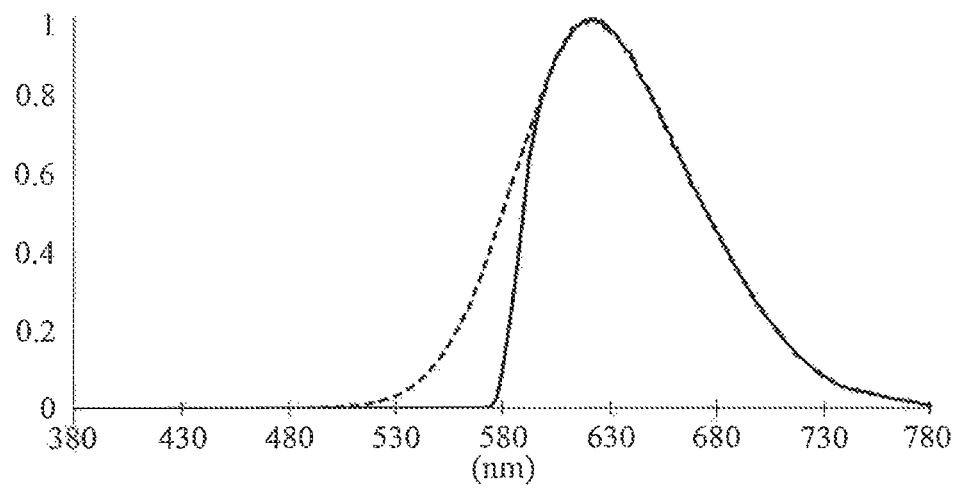
FIG. 13 illustrates a schematic diagram of a spectrum of red light filtered from red light emitted by an excited phosphor excited by the laser light to emit red light according to some embodiments of the disclosure.

Moreover there is such an additional effect that there will be purer red light filtered out from the yellow light emitted by the yellow fluorescent powder (the phosphor, coated on the fluorescent wheel, excited by the laser light to exit the yellow light) excited by the laser light in the embodiments of the disclosure, as compared with the red light filtered out from the red light emitted by the red fluorescent powder (the phosphor, coated on the fluorescent wheel, excited by the laser light to exit the red light) excited by the laser light in the prior art. As illustrated in FIG. 10, for example, there is a schematic diagram of the spectrum of the red light filtered out by the red filter section from the yellow light emitted by the excited phosphor, and here the abscissa represents the wavelength of the light, whereas the ordinate represents the strength of the light, and as may be apparent from the figure, the dotted line represents the spectrum range of the red light before being filtered (480 nanometers (nm) to 780 nm), and the solid line represents the spectrum range of the red light filtered out by the red filter section according to some embodiments of the disclosure (580 nm to 780 nm); and as illustrated in FIG. 13, there is a schematic diagram of the spectrum of the red light filtered out from the red light emitted by the red fluorescent powder excited by the laser light according to some embodiments of the disclosure, and here the dotted line represents the spectrum range of the red light before being filtered, and the solid line represents the spectrum range of the red light filtered out from the red light emitted by the red fluorescent powder excited by the laser light (570 nm to 780 nm). As may be apparent from comparison between FIG. 10 and FIG. 13, the purity of the red light filtered out from the yellow light according to some embodiments of the disclosure is higher than the purity of the red light filtered out from the fluorescent light emitted by the red fluorescent powder (a narrower width of the spectrum represents a purer color).

Figure 14:
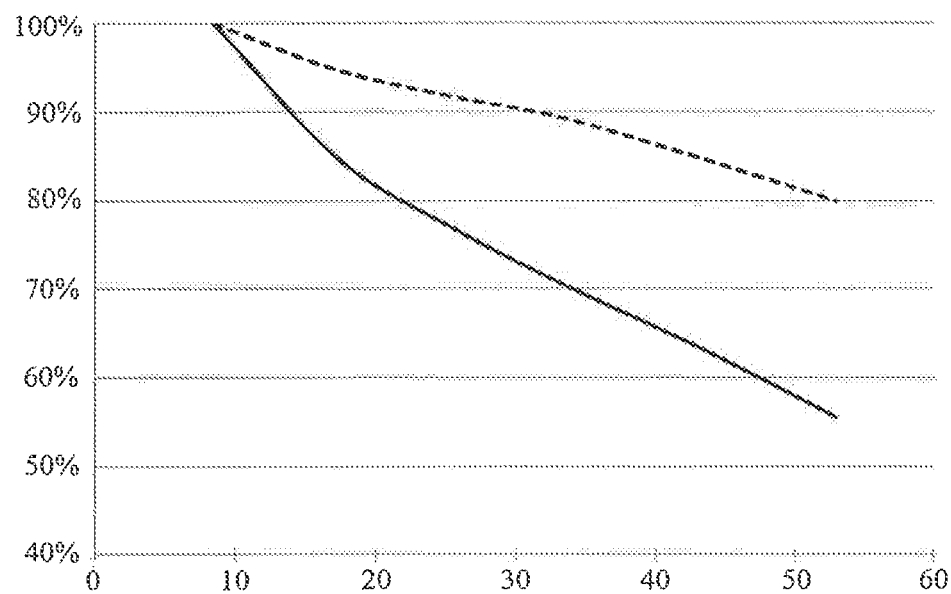
FIG. 14 illustrates a light emission efficiency graph of an excited phosphor excited to emit yellow light and an excited phosphor excited to emit red light according to some embodiments of the disclosure.

In some embodiments of the disclosure, the power of the laser light in the blue band as used above ranges from 70 W to 80 W, and as the power of the laser light increases, the excitation efficiency of the phosphor excited to emit the red light will degrade differently with the excitation efficiency of the phosphor excited to emit the yellow light. As illustrated in FIG. 14, as the power of the laser light increases, the light emission efficiency of the red light filtered out from the yellow light will be higher than the light emission efficiency of the red light emitted by the excited phosphor excited to emit the red light, so the advantage of the improvement in brightness will also become increasingly apparent; and here the dotted line represents the light emission efficiency curve of the yellow light emitted by the excited phosphor to emit the yellow light, and the solid line represents the light emission efficiency curve of the red light emitted by the excited phosphor to emit the red light.

The control unit controls the fluorescent wheel and the filter phosphor to rotate in synchronization, and in some embodiments of the disclosure, the fluorescent light emitted from the fluorescent wheel is transformed in direction by the first optical axis transformation lens, which is a dichroscope.

As for a projection display device using the light source device, one frame of image is output each time the fluorescent wheel and the filter wheel are rotated by one round, that is, the frequency at which the fluorescent wheel and the filter wheel are rotated is set the same as the display frequency of the projection display device, and the displaying effect of the image may be better at a higher frequency. For example, the fluorescent wheel and the filter wheel are rotated by 120 rounds per second at the display frequency of 120 Hz.

In operation, the control unit controls the fluorescent wheel and the filter phosphor to initially rotate until they reach a preset rotation speed, and then starts the laser and keeps the laser started while the image is being displayed.

Accordingly a part of the laser light in the blue band is transmitted from the transmission section of the fluorescent wheel, and the fluorescent light emitted by the phosphor excited by the laser light is reflected by the fluorescent wheel, and there are different light paths of the two parts of the light, so the light converging device according to some embodiments of the disclosure may further include a plurality of optical axis transformation lenses configured to focus the transmitted laser light and the fluorescent light reflected by the first optical axis transformation lens onto the same light path. As illustrated in FIG. 9, for example, the light converging device may include a second optical axis transformation lens 24a, a third optical axis transformation lens 24b and a fourth optical axis transformation lens 24c, and the three optical axis transformation lenses may be reflection mirrors or dichroscopes configured to refract and reflect the laser light in the blue band transmitted from the transmission section of the fluorescent wheel so that finally the laser light is transmitted through the first optical axis transformation lens 21 into the focusing lens 27 where the laser light is converged together with the fluorescent light emitted from the excited phosphor and reaches the filter wheel.

A collimation lens group 22 is further arranged nearby the front side and/or the back side of the fluorescent wheel; the second optical axis transformation lens parallel to the first optical axis transformation lens is arranged at the light emission side of the collimation lens group nearby the back side of the fluorescent wheel; the third optical axis transformation lens is arranged perpendicular to the second optical axis transformation lens; and the fourth optical axis transformation lens is arranged perpendicular to the third optical axis transformation lens and parallel to the first optical axis transformation lens.

The light converging device may further include an image conversion lens group 25 arranged between the second optical axis transformation lens and the fourth optical axis transformation lens; and a diffusion sheet 30 arranged at the light emission side of the image conversion lens between the third optical axis transformation lens and the fourth optical axis transformation lens to diffuse the laser light as appropriate to thereby make light spots uniformly distributed.

As illustrated in FIG. 9, there is a systematic diagram of the light source device according to some embodiments of the disclosure, which may operate as follows: laser light in blue band generated by a laser (the laser arrays 11) is shaped by the beam shaping device including the reflection mirror 12, the convex lens 13 and the concave lens 14, and the shaped laser light is emitted to the first optical axis transformation lens. Optionally the shaped laser light may pass a diffusion sheet 29 before being emitted to the first optical axis transformation lens, so that the laser light may be diffused as appropriate to thereby make light spots distributed uniformly. The laser light emitted to the first optical axis transformation lens is transmitted through the first optical axis transformation lens, adjusted by the collimation lens group and emitted to the fluorescent wheel. On one hand, the laser light in the blue band is transmitted by the transmission section of the fluorescent wheel and adjusted by the collimation lens group nearby the back side of the fluorescent wheel, then emitted to the second optical axis transformation lens, and transformed by the second optical axis transformation lens, the third optical axis transformation lens and the fourth optical axis transformation lens, and image-converted by the image conversion lens group, in the light converging device, and then emitted to the first optical axis transformation lens, transmitted through the first optical axis transformation lens and emitted to the focusing lens in the light converging device; and on the other hand, the laser light excites the phosphor on the fluorescent wheel to thereby excite and reflect the fluorescent light in the yellow band and the fluorescent light in the green band, and the fluorescent light is reflected by the first optical axis transformation lens to the focusing lens in the converging device. Thus the transmitted laser light in the blue band and the emitted fluorescent light in the yellow band and the green band are converged by the light converging device onto the same light path and emitted to the filter wheel. The light emitted to the filter wheel is transmitted by the transparent section or filtered by the filter section of the filter wheel to generate the light in the four primary colors of red, green, blue and yellow. The filtering process has been described above, so a repeated description thereof will be omitted here. The generated light in the four primary colors enters an optical rod 28.

Based on the characteristics of the spectrum of the natural light, on one hand, a spectrum of light in one band may include a part of a spectrum of light in an adjacent band thereto, and with the light source device according to the disclosure, the spectrum of the light in the yellow band may include the characteristic of a part of the spectrum of the light in the red band, and the fluorescent wheel may cooperate with the filter wheel so that after the phosphor, on the fluorescent wheel, excited by the laser light to emit the yellow light is excited by the laser light to emit the yellow light, the yellow light may be transmitted by the transparent section on the filter wheel, and the red light may be filtered out by the red filter section on the filter wheel from the yellow fluorescent light, so that the light in the two colors may be extracted from the fluorescent light in the single band; and on the other hand, when light at a long wavelength is excited using light at a short wavelength, the efficiency of the excited light will be lower if the wavelength of the light at the long wavelength is longer, and following this principle, the laser light excites the phosphor excited to emit the yellow light, and the red light is filtered out from the emitted yellow light, and since the wavelength of the yellow light is shorter than the wavelength of the red light, there will be higher light emission efficiency of the red light filtered out from the yellow light as compared with the red light generated using the excited phosphor excited by the laser light to emit the red light; and the energy efficiency of the light in the other colors and thus the overall brightness of the light source device may be improved given the improvement above in light emission efficiency of the red light at the same energy efficiency.

As for a projection display device in the prior art, a light source device is typically provided therein with a focusing lens including a spherical lens with a light emission half-angle ranging from 25° to 30°, here the light emission half-angle is half of the angle at which the light emits from the lens; and as for an ultra-short-focus projection display device, there may be significant vignetting in the lens, and in order to better control the vignetting and to reduce the angle of light incident on a optical rod, the angle of the spherical radius of the focusing lens needs to be reduced. In some embodiments of the disclosure, the light emission half-angle of the focusing lens 27 is 23° so that the brightness of the projected light may become higher and thus the operating efficiency of the projection lens may be improved.

The four colors of red, green, blue and yellow may be used as primary colors to synthesize a number of other natural colors in a wider color gamut, thereby achieving a technical effect of widening the display color gamut of the projection display device.

Some further embodiments of the disclosure further provide a projection display device including the light source device according to the embodiments above of the disclosure, and the light source device may include a laser for generating laser light, a fluorescent wheel, a filter wheel and a control unit; the fluorescent wheel includes at least one reflection section, and at least one transmission section capable of transmitting the laser light; at least one phosphor capable of being excited by the laser light to emit light in a first wavelength band, and at least one phosphor capable of being excited by the laser light to emit light in a second wavelength band are attached on the surface of the reflection section; the filter wheel includes at least one transparent section, at least one first filter section and at least one second filter section; and the control unit is configured to control the fluorescent wheel and the filter wheel to rotate in synchronization so that the transparent section of the filter wheel corresponds to the transmission section of the fluorescent wheel, and a part of the phosphor, on the fluorescent wheel, excited by the laser light to emit the light in the first band, the first filter section of the filter wheel corresponds to another part of the phosphor, on the fluorescent wheel, excited by the laser light to emit the light in the first band, and the second filter section of the filter wheel corresponds to the phosphor, on the fluorescent wheel, excited by the laser light to emit the light in the second band.

The light in the first band and the light in the second band may be visible light applicable to the inventive solution, for example, the light in the first band may be yellow light, green light, etc.; and the light in the second band may be green light, yellow light, red light, etc. Moreover the first filter section may be a red filter section, a green filter section, etc., and the second filter section may be a green filter section, a red filter section, etc.

Some embodiments of the disclosure further provide a projection display device including the light source device above. It shall be noted that the projection display device may also include a housing, a heat sink, a microprocessor and other components in addition to the light source device above. The projection display device including the light source device above may use the four colors as primary colors to synthesize a number of other colors in a wider color gamut for a better effect of displaying an image.

Some embodiments of the disclosure have at least the following technical effects or advantages.

The phosphor, on the fluorescent wheel, capable of being excited to emit the yellow light corresponds to the transparent section and the red filter section on the filter wheel, and when the phosphor is excited by the laser light to emit the yellow fluorescent light, the transparent section may transmit the yellow light, and the filter section may filter out the red light; the phosphor, on the fluorescent wheel, capable of being excited to emit the green light corresponds to one green filter section on the filter wheel, and when the phosphor is excited by the laser light to emit the green light, the green light is filtered out; and the transmission section on the fluorescent wheel corresponds to the transparent section on the filter wheel to thereby transmit the laser light, so that finally the light in the four colors may be generated from the light emission face of the filter wheel according to the setting on and the correspondence relationship between the fluorescent wheel and the filter wheel. Since the light in the four primary colors including the additional yellow color is synthesized into a number of colors, there will be a wider color gamut of the synthesized light source device than that of a number of colors into which the three primary colors are synthesized. Moreover since the efficiency of conversion into light energy at a corresponding wavelength due to excitation will become lower at a longer wavelength, thus in the technical solution according to some embodiments of the disclosure, the red light is filtered out by the red filter section from the yellow fluorescent light, and since the wavelength of the yellow light is shorter than the wavelength of the red light, there will be higher light energy, and thus higher light emission efficiency and higher brightness, of the red light filtered out from the yellow light generated by the excited phosphor excited by the laser light to emit the yellow light, as compared with the red light generated by the excited phosphor excited by the laser light to emit the red light. Also due to the improvement in light emission efficiency of the red light, the angle, on the circle, occupied by the phosphor excited to emit the yellow light may be lower than the angle occupied by the phosphor excited to emit the red light with the same energy efficiency, thus the proportions of the phosphors excited to emit the yellow light and the green light may be increased as appropriate, and the energy conversion efficiency (the light emission efficiency) of the yellow light and the green light emitted due to excitation may be improved than before. Moreover since the wavelengths of both the yellow light and the green light are shorter than that of the red light, there will be higher conversion efficiency of the yellow light and the green light emitted due to excitation than that of the red light, thus the light energy of the light in these colors may be increased to thereby improve the brightness of the light in these colors so as to improve the overall brightness of the light source device.

With the light source device and the projection display device according to some embodiments of the disclosure, the red light is filtered out from the yellow light to thereby generate the red light with higher light emission efficiency, and the yellow color is added as the fourth primary color to be synthesized with the red light, the green light and the blue light into a number of colors, thus the light emission efficiency of the red light may be improved so as to further improve the light emission efficiency of the light in the other colors, so that the four primary colors may be synthesized into a number of colors with higher overall brightness in a wider color gamut.

Although the preferred embodiments of the disclosure have been described, those skilled in the art benefiting from the underlying inventive concept may make additional modifications and variations to these embodiments. Therefore the appended claims are intended to be construed as encompassing the preferred embodiments and all the modifications and variations coming into the scope of the disclosure.

Evidently those skilled in the art may make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A light source device, comprising a laser for generating laser light, a fluorescent wheel, a filter wheel and a control unit, wherein:
   the fluorescent wheel comprises a reflection section, and a transmission section for transmitting the laser light; wherein a first phosphor and a second phosphor are attached on a surface of the reflection section, and the first phosphor is configured to be excited by the laser light to emit yellow light and the second phosphor is configured to be excited by the laser light to emit green light;
   the filter wheel comprises a transparent section, a red filter section and a green filter section; and
   the control unit is configured to control the fluorescent wheel and the filter wheel to rotate in synchronization, and the laser light emitted from the transmission section of the fluorescent wheel and a part of the yellow light emitted from the first phosphor enter into the transparent section of the filter wheel, another part of the yellow light emitted from the first phosphor enter into the red filter section of the filter wheel, and the green light emitted from the second phosphor enter into the green filter section of the filter wheel.

2. The light source device according to claim 1, wherein the laser light is in blue band.

3. The light source device according to claim 1, wherein the fluorescent wheel comprises two transmission sections centrally symmetrically distributed, two first portions where the first phosphor attached, and two second portions where the second phosphor attached, the two first portions are centrally symmetrically distributed, and the two second portions are centrally symmetrically distributed;
   the filter wheel comprises two transparent sections centrally symmetrically distributed, two red filter sections centrally symmetrically distributed, and two green filter sections centrally symmetrically distributed.

4. The light source device according to claim 3, wherein one of the transmission sections, one of the first portions and one of the second portions occupy together half of the circle of the fluorescent wheel; and
   one of the transparent sections, one of the red filter sections and one of the green filter sections occupy together half of the circle of the filter wheel.

5. The light source device according to claim 1, wherein the filter wheel comprises two transparent sections distributed opposite around the center of the filter wheel.

6. The light source device according to claim 1, wherein a collimation lens group is arranged nearby at least one of the front side and the back side of the fluorescent wheel.

7. The light source device according to claim 1, wherein the fluorescent wheel comprises one transmission section, one first portion where the first phosphor attached, and one second portion where the second phosphor attached.

8. The light source device according to claim 7, wherein the filter wheel comprises two transparent sections distributed opposite around the center of the filter wheel.

9. The light source device according to claim 8, wherein the laser light emitted from the transmission section of the fluorescent wheel enter into one of the two the transparent sections of the filter wheel, the part of the yellow light enter into another one of the two the transparent sections of the filter wheel.

10. A projection display device, comprising a laser for generating laser light, a fluorescent wheel, a filter wheel and a control unit, wherein:
    the fluorescent wheel comprises a reflection section, and a transmission section capable of transmitting the laser light; wherein a first phosphor and a second phosphor are attached on a surface of the reflection section, and the first phosphor is configured to be excited by the laser light to emit yellow light and the second phosphor is configured to be excited by the laser light to emit green light;
    the filter wheel comprises a transparent section, a red filter section and a green filter section; and
    the control unit is configured to control the fluorescent wheel and the filter wheel to rotate in synchronization, and the laser light emitted from the transmission section of the fluorescent wheel and a part of the yellow light emitted from the first phosphor enter into the transparent section of the filter wheel, another part of the yellow light emitted from the first phosphor enter into the red filter section of the filter wheel, and the green light emitted from the second phosphor enter into the green filter section of the filter wheel.

11. The projection display device according to claim 10, wherein the laser light is in blue band.

12. The projection display device according to claim 10, wherein the fluorescent wheel comprises two transmission sections centrally symmetrically distributed, two first portions where the first phosphor attached, and two second portions where the second phosphor attached, the two first portions are centrally symmetrically distributed, and the two second portions are centrally symmetrically distributed;
    the filter wheel comprises two transparent sections centrally symmetrically distributed, two red filter sections centrally symmetrically distributed, and two green filter sections centrally symmetrically distributed.

13. The projection display device according to claim 12, wherein one of the transmission sections, one of the first portions and one of the second portions occupy together half of the circle of the fluorescent wheel; and
    one of the transparent sections, one of the red filter sections and one of the green filter sections occupy together half of the circle of the filter wheel.

14. The projection display device according to claim 10, wherein the filter wheel comprises two transparent sections distributed opposite around the center of the filter wheel.

15. The projection display device according to claim 10, wherein the fluorescent wheel comprises one transmission section, one first portion where the first phosphor attached, and one second portion where the second phosphor attached.

16. The projection display device according to claim 15, wherein the filter wheel comprises two transparent sections distributed opposite around the center of the filter wheel, and the laser light emitted from the transmission section of the fluorescent wheel enter into one of the two the transparent sections of the filter wheel, the part of the yellow light enter into another one of the two the transparent sections of the filter wheel.

17. A projection display device, comprising a laser for generating laser light, a fluorescent wheel, a filter wheel and a control unit, wherein:
    the fluorescent wheel comprises a reflection section, and a transmission section for transmitting the laser light; wherein a first phosphor and a second phosphor are attached on a surface of the reflection section, and the first phosphor is configured to be excited by the laser light to emit a first light in a first band, and the second phosphor is configured to be excited by the laser light to emit a second light in a second band;

the filter wheel comprises a transparent section, a first filter section and a second filter section; and the control unit is configured to control the fluorescent wheel and the filter wheel to rotate in synchronization, and the laser light emitted from the transmission section of the fluorescent wheel and a part of the first light emitted from the first phosphor enter into the transparent section of the filter wheel, another part of the first light emitted from the first phosphor enter into the first filter section of the filter wheel, and the second light emitted from the second phosphor enter into the second filter section of the filter wheel.

18. The projection display device according to claim 17, wherein the laser light is blue laser light, and the second light is green light.

19. The projection display device according to claim 17, a first filter section is a red filter section, the first light is light which can be filtered by the red filter section to generate red light.

20. The projection display device according to claim 17, wherein the fluorescent wheel comprises one transmission section, one first portion where the first phosphor attached, and one second portion where the second phosphor attached;

wherein the filter wheel comprises two transparent sections distributed opposite around the center of the filter wheel;

the laser light emitted from the transmission section of the fluorescent wheel enter into one of the two transparent sections of the filter wheel, the part of the first light enter into another one of the two transparent sections of the filter wheel.

\* \* \* \* \*